United States Patent [19] [11] Patent Number: 4,696,411
Graf et al. [45] Date of Patent: Sep. 29, 1987

[54] LARGE BREAKSEAL ACTUATOR WITH BUILT-IN VALVE

[75] Inventors: Hans-Juergen Graf, Oceanside; Peter T. Randke, San Marcos, both of Calif.

[73] Assignee: Air Products and Chemicals, Inc., Allentown, Pa.

[21] Appl. No.: 865,147

[22] Filed: May 20, 1986

[51] Int. Cl.⁴ .............................................. B65D 43/04
[52] U.S. Cl. .................................... 220/281; 220/307; 141/326; 222/81; 422/99
[58] Field of Search ................. 141/19, 329, 330, 326, 141/327; 222/81, 80; 220/246–277, 281, 307; 422/99

[56] References Cited

U.S. PATENT DOCUMENTS 3,494,370 2/1970 Wahl et al. ........................ 137/68.1
3,609,825 1/1969 Pullos ................................ 137/68.1

Primary Examiner—Houston S. Bell, Jr.
Attorney, Agent, or Firm—Grant L. Hubbard

[57] ABSTRACT

A chemical vessel having improved access means comprising an access tube forming an openable conduit, being closed at the internal end with a discoid breakseal during shipment, a chemical removal tube slidably mounted in gas tight relationship inside the access tube, and means for moving the removal tube into engagement with and breaking out the breakseal for permitting removal of chemical from the vessel is disclosed.

3 Claims, 1 Drawing Figure

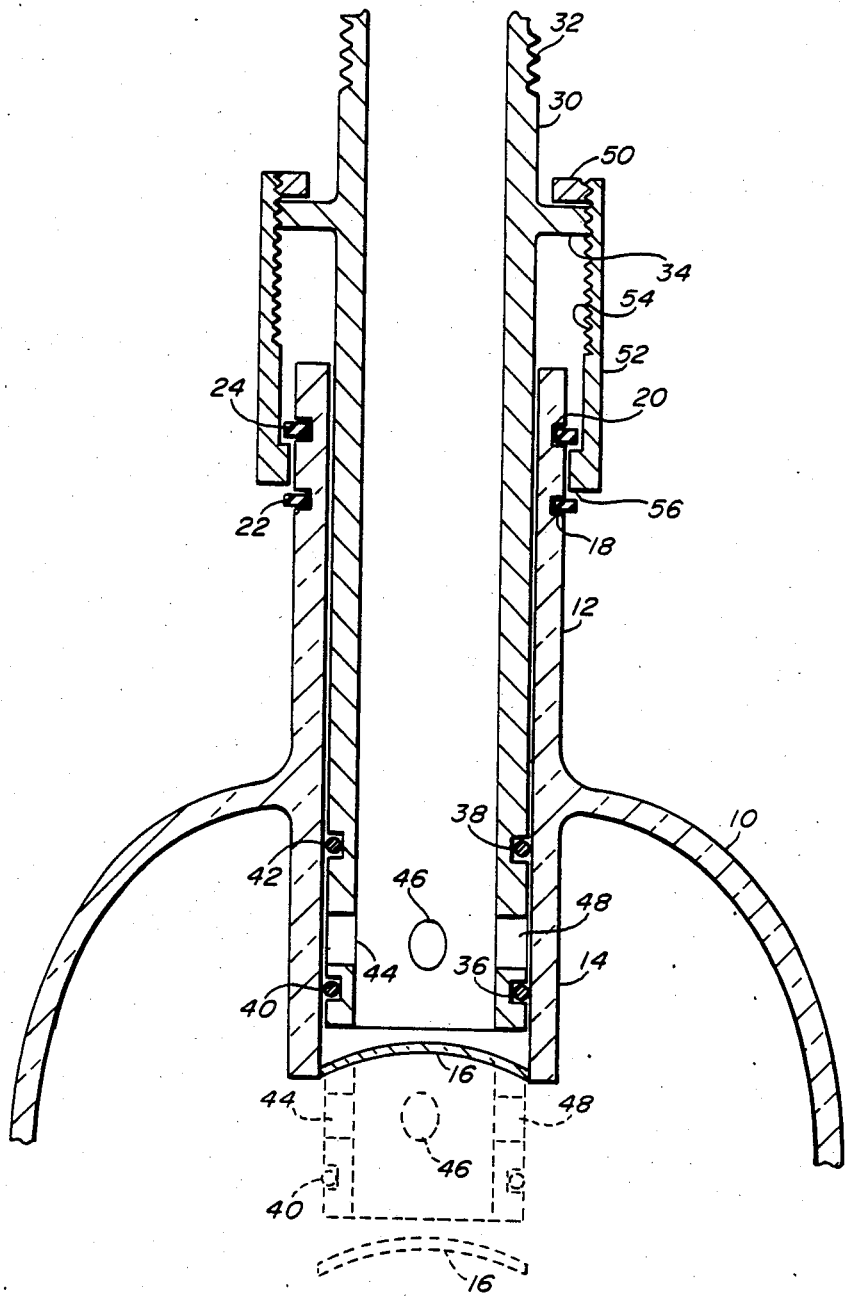

LARGE BREAKSEAL ACTUATOR WITH BUILT-IN VALVE

FIELD OF THE INVENTION

This invention relates to ultra-pure chemical handling equipment.

BACKGROUND OF THE INVENTION

It has become of great importance in a number of chemical process industries to produce, package, ship and use ultrahigh purity chemicals. One such industry in which the requirement for ultrapure chemicals is paramount, and where many of the chemicals are toxic, flammable, or otherwise hazardous is the semiconductor manufacturing industry.

It is now common practice to package ultrapure semiconductor reagents in quartz containers sealed with a quartz breakseal. This technique was pioneered by the J. C. Schumacher Company and apparatus of this type is shown in U.S. Pat. Nos. 4,134,514 and 4,298,037.

Notwithstanding the strides made in the past, there remain a serious problems in the techniques and apparatus for shipping highly reactive ultrapure chemicals, and in connecting containers of such chemicals to the system in which the chemicals will be used. A feature of this invention is to provide a new and improved breakseal arrangement which includes built-in valve and which minimizes exposure of the chemical to the surrounding atmosphere and prevents contamination of the chemical during connection and use.

SUMMARY OF THE INVENTION

The present invention comprises an access tube forming an openable conduit into the chemical containing vessel, the tube being closed at the internal end with a discoid breakseal during shipment, a chemical removal tube slidably mounted in gas tight relationship inside the access tube, and means for moving the removal tube into engagement with and breaking out the breakseal for permitting removal of chemical from the vessel.

A quartz or glass vessel for high purity chemicals is provided with improved means for access to such chemicals the combination of an access tube extending into the vessel having the internal end thereof closed by a discoid breakseal. A removal tube is positioned inside the access tube to permit axial and reciprocal movement therein. The internal end of the removal tube is closed, the removal tube having formed through the walls thereof proximate the internal end thereof at least one passage. Slidable seals between the removal tube and the internal wall of the access tube respectively on the proximal and distal side of the passage and means for moving the removal tube axially in gas-tight sealed relationship with the the access tube permits the operator to break out the breakseal and extend the proximal end of the removal tube into the vessel to provide fluid communication through the passage in the removal tube wall, without exposing the chemical in the vessel to atmosphere. The removal tube may then be moved upwardly to re-seal the vessel.

DESCRIPTION OF THE DRAWING

The single FIGURE depicts the present invention, showing the components and assembly thereof in cross-section, an alternate position of the tip end of the removal tube being shown in phantom lines.

DESCRIPTION OF THE PREFERRED EMBODIMENT

The following description is exemplary and not limiting of the scope of the invention. Materials mentioned are only suggested for particular applications and a wide variety of materials may be used. Likewise, the specific structures are shown merely to exemplify one preferred form of the invention.

The present invention is part of a vessel 10 for chemical reagent. The vessel 10 may be of any configuration and, therefore, only the top is shown. The aforesaid patents disclose exemplary configurations of the vessel without the present invention forming the closure thereto. Typically, in the semiconductor industry, these vessels are formed of fused quartz or borosilicate glass, but other materials may be used. In other contexts, polytetrafluoroethylene, polyethylene, etc. may be quite satisfactory as a container materials.

As shown in the FIGURE, the upper portion of the vessel 10 is secured to by fusion with an access tube 12, the proximal end 14 of which extends down into the vessel 10 and is closed, during shipment, with a discoid breakseal 16 fused integrally with the access tube. The distal end of the access tube is formed to form two outer peripheral grooves 18 and 20 which permit the removal apparatus to be attached to the distal end of the access tube by means of semi-resilient retainer rings 22 and 24. Discoid, as used here, implies a generally disc shaped piece of quartz, or other material, but the closure may be of any configuration. Semi-resilient, as used here, implies that the retainer rings are resilient enough to permit them to be slid over the end of the access tube and lodged in the grooves, but rigid enough to retain a sleeve on the access tube which applies essentially sheer forces on the ring. Polytetrafluoride, chloro-fluoroethylene based polymers generally, nylon, and other polymers may be used in forming the retaining rings. The access tube may be welded or secured in the vessel in any desired manner.

Inside the access tube there is disposed a removal tube 30, the proximal end being closed, the distal end of which may be threaded or equipped with any desired type of connecting mechanism. The removal tube is formed, in the exemplary embodiment, of stainless steel, tantalum, or other material which is inert to the chemical to be removed from the vessel.

Associated with, attached to or formed integrally with the removal tube 30 is a sleeve 34 or other mechanism for moving the removal tube in and axially of the access tube 12. Adjacent the proximal end of the removal tube, a pair of spaced grooves 36 and 38 receive O-rings 42 and 44, completing a slidable, gas-tight seal between the access tube 12 and the removal tube 30 on the upper and lower sides, as shown, of one or more passages 44, 46 and 48 through the wall of the removal tube; thus permitting the removal tube to slide reciprocally in the access tube while maintaining a seal therebetween.

In the exemplary embodiment, a keeper 50 is threadably received in a retainer nut 52 in an upper portion, as shown in the FIGURE, of the discontinuous thread set 54 formed in nut 52, having an upper thread portion which engages the keeper 50 and a lower portion which engages the threaded periphery of the movement sleeve 34. A sleeve portion of nut 54 fits snugly over the access tube and is retained thereon by the retainer rings 22 and 24 in grooves 18 and 20 formed in the outer, distal portion of the access tube 12.

The vessel is filled, using a special fill tube as described in the aforementioned patents, for example, or using any desired apparatus, and is sealed. Once sealed, the container and contents have a long shelf-life because of the virtually totally impervious containment provided by the quartz vessel and the discoid quartz seal fused on and integrally closing the end of the access tube and the vessel.

When the contents of the vessel are to be used, the system in which the contents will be used is connected to the distal end of the removal tube. Any type of connector may be used. In an exemplary embodiment, the connector may be a gas-tight rotating connector to permit the removal tube to be rotated. The entire system is evacuated and/or purged and the removal tube is forced into engagement with the discoid breakseal and is then moved to break out the breakseal and the proximal tip thereof is moved into the vessel to the point where the contents of the vessel may be removed through the orifices 44, 46 and 48, as shown in dashed lines in the FIGURE. When all of the desired portion of the vessel contents are removed, the removal tube is moved upwardly to the original position, thus sealing the vessel again, the lower groove and O-ring 36 and 40 forming a gas-tight seal between the inside of the vessel and the inside of the removal tube; the upper groove and O-ring preventing entry of atmospheric contaminants.

INDUSTRIAL APPLICATION

This invention is useful in the chemical process industries generally and finds specific application in the manufacture, packaging, shipment, handling and use of reagents in chemical industries generally and in the manufacture of semiconductors in particular.

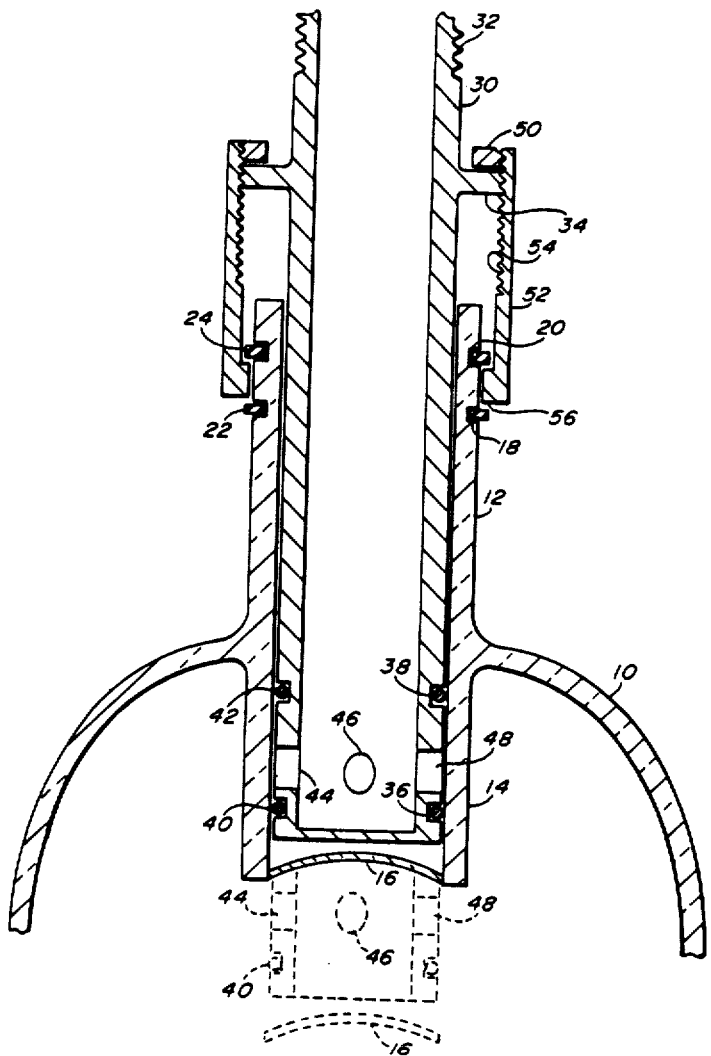

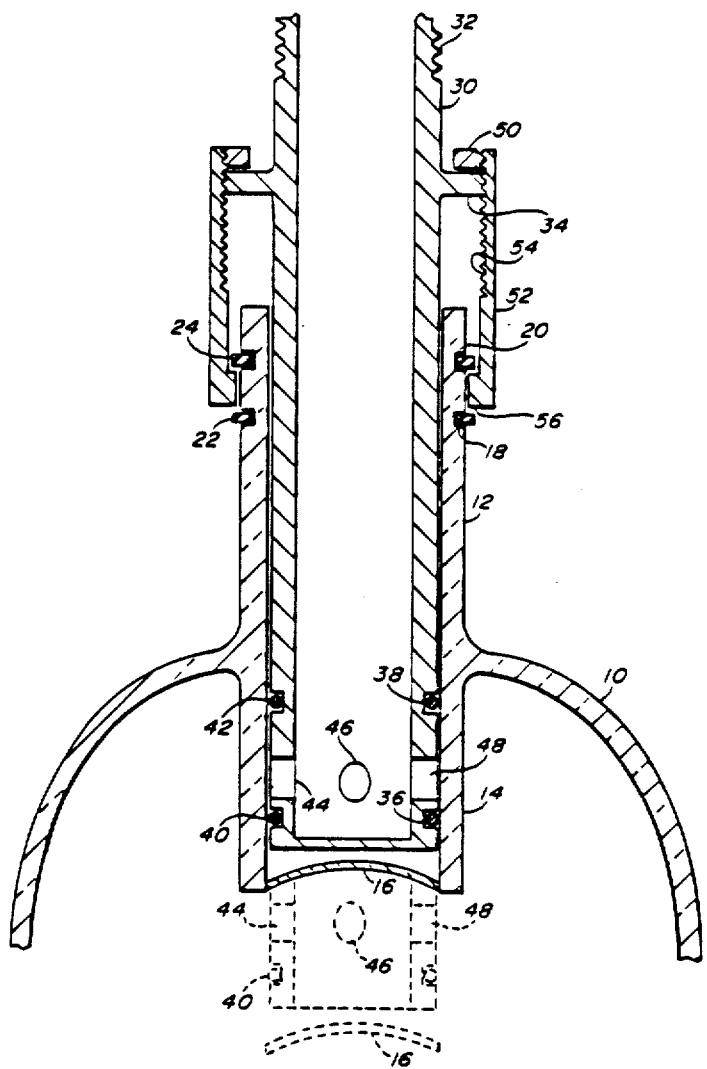

What is claimed is:

1. A quartz or glass vessel for high purity chemicals comprising a container and means for permitting access to the contents of the container comprising:
    an access tube (12) extending into the vessel having the internal end thereof closed by a discoid breakseal (16);
    a removal tube (3) inside the access tube, the internal end closed and having formed through the walls thereof proximate the internal end thereof at least one passage (44, 46 or 48);
    means forming a slidable seals (36, 38 40 and 42) between the removal tube (30) and the internal wall of the access tube (12) respectively on the proximal and distal side of the passage (44, 46 or 48); and
    means (34, 52, 18 and 20) for moving the removal tube (30) axially in gas-tight sealed relationship with the access tube (12) to break the breakseal (16) and extend the proximal end of the removal tube (30) into the vessel (10) to provide fluid communication through the passage through the wall thereof 44, 46 or 48).

2. A vessel for containing high purity chemicals comprising a container and access means comprising:
    an access tube (12) extending into the vessel having the internal end thereof closed by breakseal (16);
    a removal tube (30) inside the access tube, the internal end closed and having formed through the walls thereof proximate the internal end thereof at least one passage (44, 46 or 48); and
    means forming a slidable seals (36, 38, 40 and 42) between the removal tube (30) and the internal wall of the access tube (12) respectively on the proximal and distal side of the passage (44, 46 or 48).

3. A chemical reagent vessel comprising a container and access means comprising an access tube, a breakseal closing the proximal end of the access tube; a removal tube having the proximal end closed except for at least one passage through the removal tube walls proximate said end thereof; and seals on the removal tube on each side of the passage forming a slidable, gas-tight seal with the internal wall of the access tube, the removal tube being reciprocally moveable in the access tube from within the access tube to extend the proximal end of the removal tube through the end of the access tube, breaking the breakseal, to establish fluid communication through the passage from the vessel to the removal tube and for moving the removal tube back to a position closing the vessel, one seal forming a gas-tight seal with the interior of the access tube between the passage vessel interior.

* * * * *

UNITED STATES PATENT AND TRADEMARK OFFICE
CERTIFICATE OF CORRECTION

PATENT NO. : 4,696,411

DATED : September 29, 1987

INVENTOR(S) : Hans-Juergen Graf, et al

It is certified that error appears in the above-identified patent and that said Letters Patent is hereby corrected as shown below:

The title page should be deleted to appear as per attached title page.

Column 4, Claim 1, line 1, the parenthetical numeral "(3)" should be --(30)--.

The sheet of Drawing showing the illustrative Figure should be deleted to appear as per attached sheet.

Signed and Sealed this

Fourth Day of October, 1988

Attest:

DONALD J. QUIGG

Attesting Officer

Commissioner of Patents and Trademarks

United States Patent [19]
Graf et al.

[11] Patent Number: 4,696,411
[45] Date of Patent: Sep. 29, 1987

[54] LARGE BREAKSEAL ACTUATOR WITH BUILT-IN VALVE

[75] Inventors: Hans-Juergen Graf, Oceanside; Peter T. Randke, San Marcos, both of Calif.

[73] Assignee: Air Products and Chemicals, Inc., Allentown, Pa.

[21] Appl. No.: 865,147

[22] Filed: May 20, 1986

[51] Int. Cl.⁴ .................................. B65D 43/04
[52] U.S. Cl. ............................. 220/281; 220/307; 141/326; 222/81; 422/99
[58] Field of Search ............... 141/19, 329, 330, 326, 141/327; 222/81, 80; 220/246–277, 281, 307; 422/99

[56] References Cited
U.S. PATENT DOCUMENTS
3,494,370 2/1970 Wahl et al. ............... 137/68.1
3,609,825 1/1969 Pullos ........................ 137/68.1

Primary Examiner—Houston S. Bell, Jr.
Attorney, Agent, or Firm—Grant L. Hubbard

[57] ABSTRACT

A chemical vessel having improved access means comprising an access tube forming an openable conduit, being closed at the internal end with a discoid breakseal during shipment, a chemical removal tube slidably mounted in gas tight relationship inside the access tube, and means for moving the removal tube into engagement with and breaking out the breakseal for permitting removal of chemical from the vessel is disclosed.

3 Claims, 1 Drawing Figure